Jan. 19, 1960  E. C. McRAE  2,921,807
PREFOCUSED REAR VIEW MIRROR
Filed Oct. 26, 1956
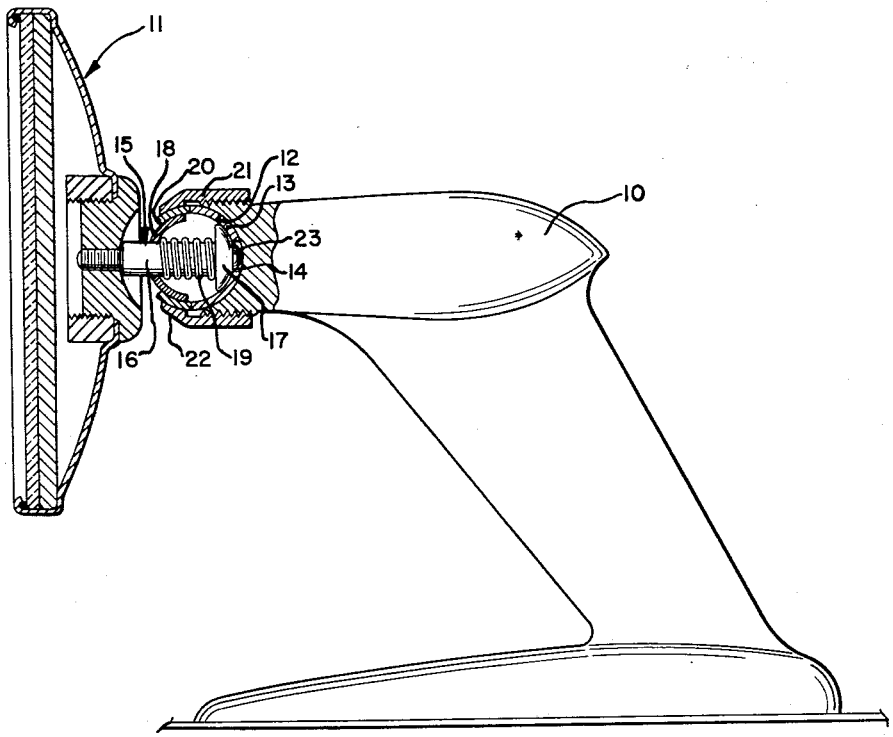
E.C. McRAE
INVENTOR.
BY J. R. Faulkner
T. H. Oster
ATTORNEYS 2,921,807

PREFOCUSED REAR VIEW MIRROR

Edwin C. McRae, Dearborn, Mich., assignor to Ford Motor Company, Dearborn, Mich., a corporation of Delaware Application October 26, 1956, Serial No. 618,552

2 Claims. (Cl. 287—12)

This invention relates to rear view mirror supports for motor vehicles, and more particularly to a prefocused mirror support which permits the mirror to be returned to precisely the original setting subsequent to being disturbed.

Every driver has experienced the annoyance of refocusing a rear view mirror which has been tilted out of adjustment. This annoyance is particularly apparent when the mirror is outboard mounted where, at the expense of safety and comfort, the operator must tediously refocus the mirror to his liking from the driver's seat. When an adjustable mirror is made sufficiently free to be readily adjusted by the operator, the mirror is usually moved when it is being cleaned.

An object of my invention is to provide an inexpensive, flexible mirror mount whereby the operator can initially set the optimum position of a rear view mirror, and can readily reset the mirror to this optimum position upon disarrangement thereof.

Another object is to provide a resilient coupling between a rear view mirror and its support to protect the mirror.

Further advantages and objects of my invention will become apparent by reference to the drawing and the following description.

The drawing shows an outside rear view mirror partly in cross section.

The mounting bracket 10 is adapted for fixture to a motor car and supports the mirror assembly 11 through the medium of my invention. I have provided mounting bracket 10 with a substantially hemispherical socket 12. Into socket 12 I have fitted a hemispherical shell 13 which is rotatable within the socket. At the vertex of shell 13, I have provided a detent-receiving recess 14.

Mirror-supporting stud 15 has a longitudinal shank 16 and a mushroom-shaped end portion 17, the curvature of which end portion substantially conforms to the inner surface of shell 13. Stud supporting washer 18 is slidably mounted on shank 16 and is arranged so that the outer surface of the washer conforms to the inner surface of shell 13.

Spring 19 is compressed between end portion 17 and washer 18. Washer 18 is held in place by the combination of spherical segment 20 and the collar 21. Spherical segment 20 is fitted over washer 18 with a radius and center of curvature coincident with those of shell 13, and is, in effect, a continuation of shell 13.

Collar 21 is threaded and is adapted to be tightened over mounting bracket 10 and includes an inwardly-inclined, annular flange 22 adapted to engage segment 20. When collar 21 is tightened in place as shown, spherical segment 20 and shell 13 together form a ball socket. Washer 18 is held by spring 19 against the inner surface of segment 20 to form a closure for the ball socket and to form a slidable support for shank 16.

A detent-engaging, raised portion 23 is formed on the crown of end portion 17 and is normally urged into coincidence with recess 14 by spring 19. When collar 21 is tightened against segment 20, a deflecting force on mirror assembly 11 will cause the displacement of stud 15 out of detent position with concomitant sliding action of washer 18. The amount of this movement is limited by shank 16 hitting segment 20 or annular flange portion 22 of collar 21. The operator may, by hand manipulation, return mirror assembly 11 to the point of original focusing by turning until detent 14—23 engages.

Original mirror alignment is accomplished by the loosening of collar 21, thereby permitting shell 13 to rotate with stud 15, and by visually aligning the mirror to the desired position. Retightening collar 21 fixes shell 13 and assures a prefocused detent position for simplified and accurate repositioning whenever subsequent disarrangement occurs.

It is understood that certain departures from the detail description can be made without departing from my invention. For instance, the relative positions of detent receiving recess 14 and detent raised portion 23 may be reversed. Also, the region surrounding the detent portion 14 of shell 13 may be tapered toward the detent so that spring 19 will urge re-engagement of the detent without attention from the operator.

What is claimed is:

1. An adjustable mirror support comprising a mounting bracket having a substantially hemispherical opening therein, a hemispherical shell conforming to the interior of said opening and adapted to rotate within said opening, said shell provided with a first detent portion, a spherical segment abutted against said shell, adjustable collar means on said mounting bracket engageable with said segment for holding said shell normally fixed within said opening, a mirror supporting stud projected within said shell including an enlarged portion conforming to the interior of said shell and a second detent portion thereon cooperable with said first detent portion, a washer member slidably and axially positioned on said stud between said segment and said enlarged portion, and spring means positioned between said washer and said enlarged portion to urge said portion against said shell.

2. A mirror assembly comprising a bracket and a mirror supported by said bracket, said mirror and bracket being joined by a pair of mutually coacting detent members one of which is contained within the bracket and the other secured to the mirror, means for permanently locking in the desired angular position with relation to the bracket the detent member contained within said bracket, a spring biasing together the mutually coacting detent members, said mirror being normally secured in the desired angular position only by the spring urged and releasable engagement of the mutually coacting detent members, said mirror and bracket being capable of relative angular movement when sufficient force is applied to overcome the spring bias and disengage the coacting detent members, said angular movement being accomplished without releasing the detent member locked to the bracket from its permanent position with respect to the bracket, whereby the mirror may be moved readily from the desired angular position and returned precisely to the desired angular position.

References Cited in the file of this patent

UNITED STATES PATENTS

| | | |
|---|---|---|
| 1,812,614 | Viken | June 30, 1931 |
| 2,534,495 | Younghusband | Dec. 19, 1950 |

FOREIGN PATENTS

| | | |
|---|---|---|
| 1,023,077 | France | Mar. 13, 1953 |